United States Patent
Appaji

(10) Patent No.: US 8,302,150 B2
(45) Date of Patent: Oct. 30, 2012

(54) METHOD AND SYSTEM FOR MANAGING THE FUNCTIONALITY OF USER DEVICES

(75) Inventor: Anuradha K. Appaji, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 841 days.

(21) Appl. No.: 11/599,955

(22) Filed: Nov. 15, 2006

(65) Prior Publication Data
US 2008/0065908 A1 Mar. 13, 2008

Related U.S. Application Data

(60) Provisional application No. 60/843,258, filed on Sep. 8, 2006.

(51) Int. Cl.
*G06F 17/00* (2006.01)
(52) U.S. Cl. ............... 726/1; 380/258; 713/193
(58) Field of Classification Search ................... 713/193; 726/1; 380/258
See application file for complete search history.

(56) References Cited

U.S. PATENT DOCUMENTS

| 6,125,446 A * | 9/2000 | Olarig et al. ............... 726/8 |
| 2001/0011352 A1* | 8/2001 | O'Mahony ............... 713/200 |
| 2002/0124067 A1* | 9/2002 | Parupudi et al. ............... 709/223 |
| 2003/0018892 A1* | 1/2003 | Tello ............... 713/164 |
| 2003/0189418 A1* | 10/2003 | Schinner ............... 320/136 |
| 2005/0221841 A1* | 10/2005 | Piccionelli et al. ........ 455/456.3 |
| 2005/0222933 A1* | 10/2005 | Wesby ............... 705/36 |
| 2005/0277428 A1* | 12/2005 | Nathan Brown ............ 455/456.3 |
| 2006/0230191 A1* | 10/2006 | Chang et al. ............... 710/15 |

* cited by examiner

*Primary Examiner* — Cordelia Zecher

(57) ABSTRACT

A method for managing the functionality of a user device is provided that includes storing security information for a secure zone in a user device. The security information for the secure zone includes at least one peripheral associated with the secure zone. Based on the security information for the secure zone, the at least one peripheral associated with the secure zone is automatically disabled when the user device enters the secure zone.

25 Claims, 3 Drawing Sheets

METHOD AND SYSTEM FOR MANAGING THE FUNCTIONALITY OF USER DEVICES

CROSS-REFERENCE TO RELATED APPLICATION(S) AND CLAIM OF PRIORITY

The present application is related to U.S. Provisional Patent No. 60/843,258, filed Sep. 8, 2006, titled "Method for Managing Enterprise Security via User Devices." Provisional Patent No. 60/843,258 is assigned to the assignee of the present application and is hereby incorporated by reference into the present application as if fully set forth herein. The present application hereby claims priority under 35 U.S.C. §119(e) to U.S. Provisional Patent No. 60/843,258.

TECHNICAL FIELD OF THE INVENTION

The present invention relates generally to enterprise security and, more specifically, to a method and system for managing the functionality of user devices in an enterprise.

BACKGROUND OF THE INVENTION

Wireless communications systems, including cellular phones, paging devices, and personal communication services (PCS) systems, have become ubiquitous in society. These and other types of user devices are frequently provided with additional capabilities, such as cameras, USB connectors, Bluetooth functionality, and the like. When users carrying these devices enter a facility where confidential work product or other sensitive information is potentially available, the enterprise operating the facility may desire device capabilities such as cameras and the like to be disabled in order to protect the information within the facility.

Currently suggested solutions to this problem include a mechanism for detecting the user devices by a server at the facility. The server may then disable the offensive device capabilities while the user device is within the facility. However, using this approach, the server may be flooded with device detection events at the beginning of a workday, at the beginning of an event or at other such occasions. These occasions may result in a server overload or the need to implement multiple servers, both of which are undesirable. Therefore, there is a need in the art for an improved method for managing the functionality of user devices in an enterprise.

SUMMARY OF THE INVENTION

A method for managing the functionality of a user device is provided. According to an advantageous embodiment of the present disclosure, the method includes storing security information for a secure zone in a user device. The security information for the secure zone includes at least one peripheral associated with the secure zone. Based on the security information for the secure zone, the at least one peripheral associated with the secure zone is automatically disabled when the user device enters the secure zone.

According to another embodiment of the present disclosure, a user device is provided that includes at least one peripheral, security data and a peripheral controller. The security data is operable to store security information for at least one secure zone. The security information for the secure zone includes at least one peripheral associated with the secure zone. The peripheral controller is operable to disable the at least one peripheral associated with the secure zone when the user device enters the secure zone based on the security information for the secure zone.

According to yet another embodiment of the present disclosure, a system for managing the functionality of user devices is provided that includes a secure zone and a server for the secure zone. The server includes a security controller that is operable to provide security information for the secure zone to a plurality of user devices. Each of the user devices is operable to automatically disable at least one peripheral identified by the security information for the secure zone when the user device enters the secure zone.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the term "each" means every one of at least a subset of the identified items; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

Figure 1:
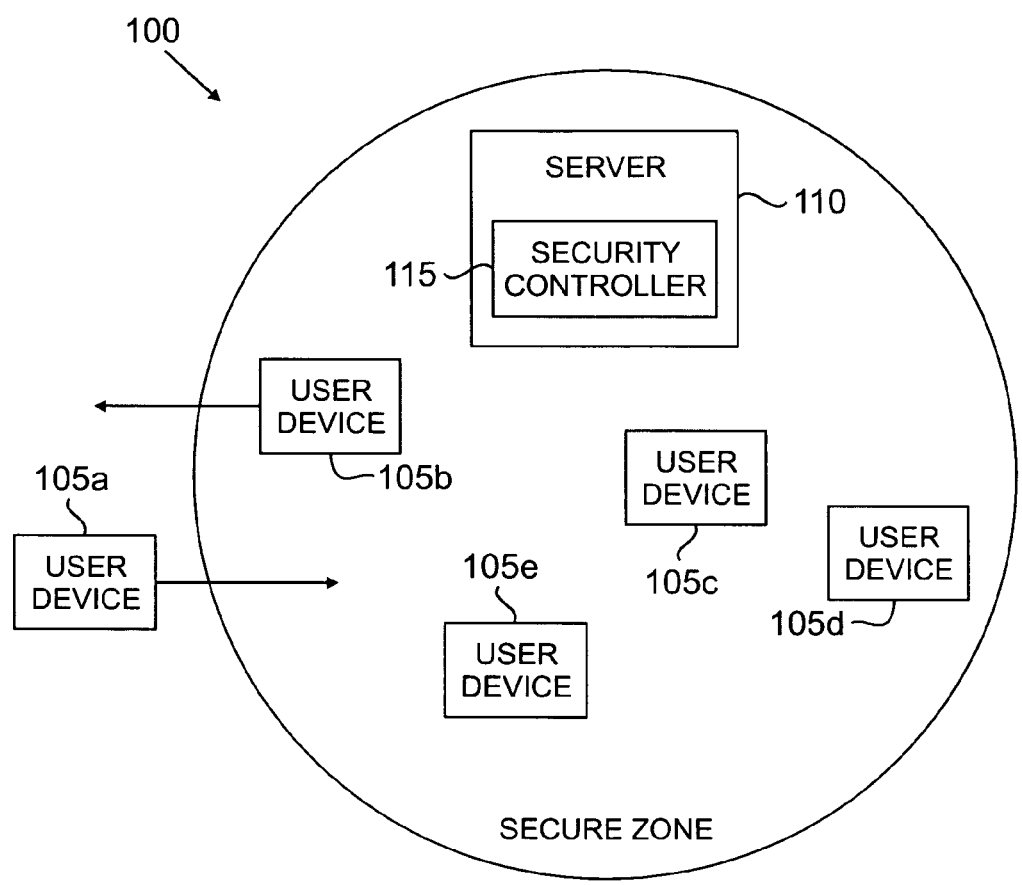
FIG. 1 illustrates a system for managing the functionality of user devices in an enterprise according to one embodiment of the disclosure.
Figure 2:
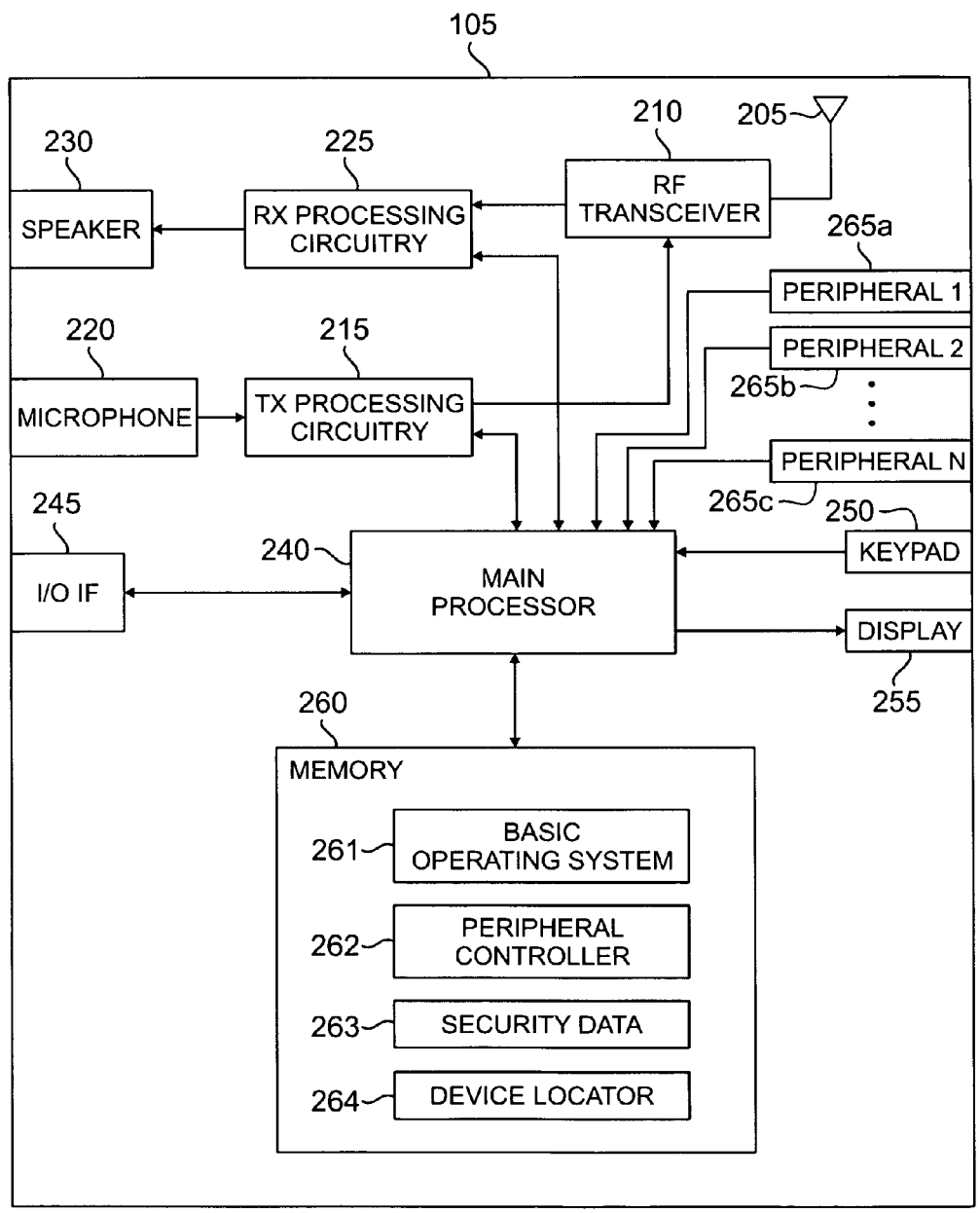
FIG. 2 illustrates details of one of the user devices of FIG. 1 according to one embodiment of the disclosure.
Figure 3:
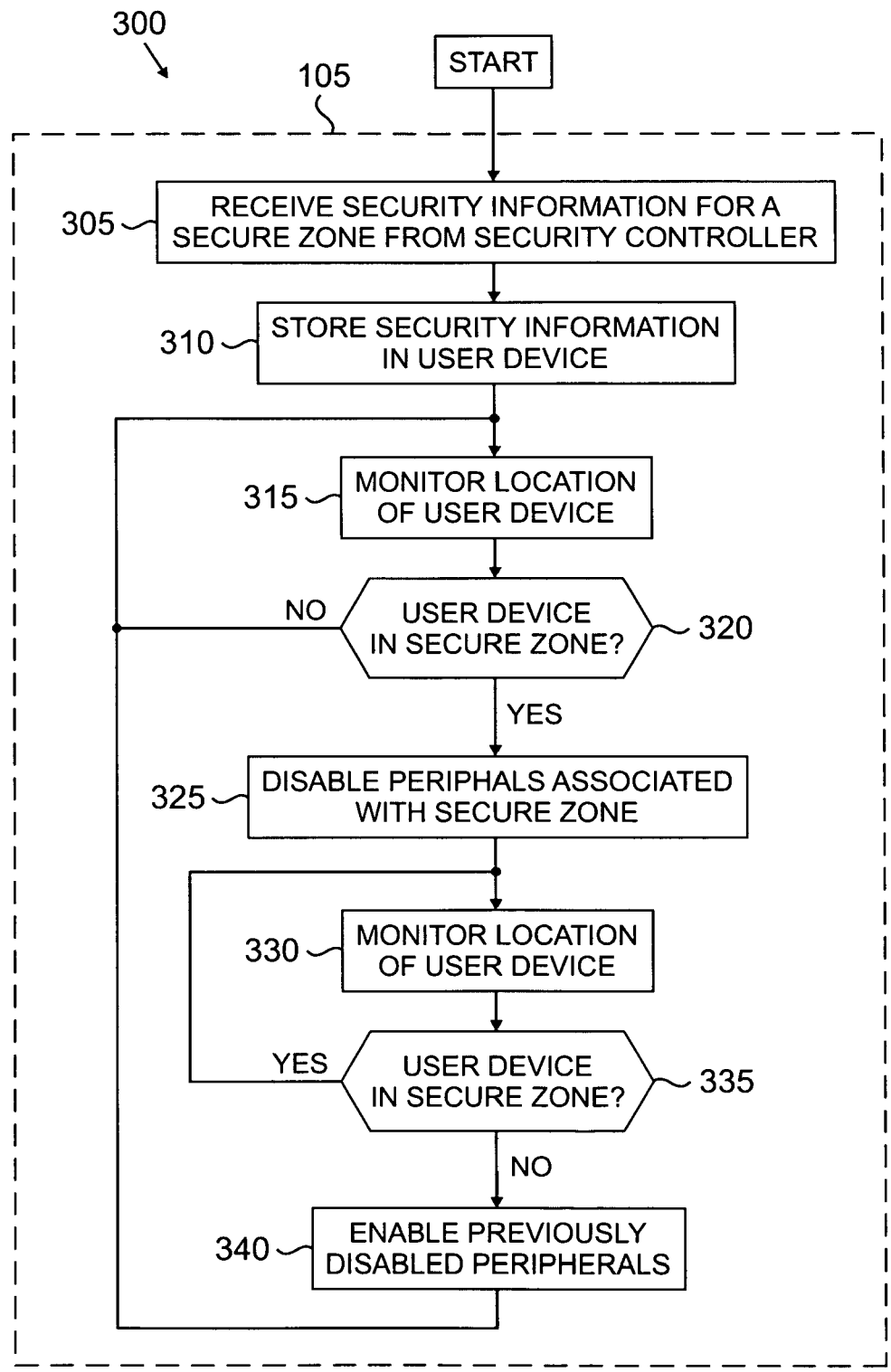
FIG. 3 is a flow diagram illustrating a method for managing the functionality of the user device of FIGS. 1 and 2 according to one embodiment of the disclosure.

FIGS. 1 through 3, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless system.

FIG. 1 illustrates a system 100 for managing the functionality of a plurality of user devices 105 in an enterprise according to one embodiment of the disclosure. In addition to user devices 105, system 100 comprises at least one server 110. User devices 105 and server 110 are operable to communicate with each other over a wireless network (not shown in FIG. 1), which may comprise any suitable combination of antennas, communication lines, servers, sub-networks and/or additional components. Although the illustrated embodiment comprises five user devices 105a-e and one server 110, it will be understood that system 100 may comprise any suitable number of user devices 105 and servers 110 without departing from the scope of the present invention.

For one embodiment, system 100 may be an enterprise or part of an enterprise, such as a corporate campus or the like, in which proprietary or otherwise sensitive information may be found. In addition, for one embodiment, at least some of user devices 105 may comprise mobile phones. However, it will be understood that some or all of user devices 105 may comprise other wireless devices capable of capturing the sensitive information available in the enterprise.

Server 110 comprises a security controller 115 that is operable to provide security for a secure zone 120 within the enterprise. For one embodiment, secure zone 120 may comprise the entire enterprise. For other embodiments, the enterprise may comprise a plurality of secure zones 120, with one or more security controllers 115 corresponding to each secure zone 120.

Secure zone 120 may comprise a specific geographical area, such as an area identified by a particular set of Global Positioning System (GPS) coordinates along with a particular secure zone radius. User device 105a is moving into secure zone 120 and user device 105b is moving out of secure zone 120, as indicated by the direction arrows proximate user devices 105a and 105b. Although illustrated as circular for the purposes of illustration and explanation, it will be understood that secure zone 120 may have any other irregular shape, depending on the configuration selected and variations in the environment associated with natural and man-made obstructions in and around secure zone 120.

As described in more detail below in connection with FIG. 2, each user device 105 comprises one or more peripherals and a peripheral controller that is operable to disable and enable the peripherals in order to protect information in secure zone 120. Security controller 115 is operable to initialize and maintain data in the peripheral controller so that the peripheral controller functions as desired.

Thus, for the illustrated embodiment, user device 105a is operable to disable peripherals that may pose a risk to the enterprise automatically as user device 105a enters secure zone 120 based on data provided by security controller 115. Similarly, user device 105b is operable to enable previously disabled peripherals automatically as user device 105b exits secure zone 120 based on data provided by security controller 115. As used herein, "automatically" means that the user device 105 is operating independently without server interaction.

For other embodiments, server 110 may also be operable to initialize and maintain data in user devices 105 such that the peripheral controllers may each manage the functionality of peripherals for purposes other than security.

FIG. 2 illustrates details of one of the user devices 105 according to one embodiment of the disclosure. For this embodiment, user device 105 comprises a mobile phone. Thus, it will be understood that other embodiments of user device 105 may be implemented. User device 105 for the illustrated embodiment comprises antenna 205, radio frequency (RF) transceiver 210, transmitter (TX) processing circuitry 215, microphone 220, and receiver (RX) processing circuitry 225. User device 105 also comprises speaker 230, main processor 240, input/output (I/O) interface 245, keypad 250, display 255, and memory 260. Memory 260 further comprises basic operating system (OS) program 261, peripheral controller 262, security data 263 and device locator 264.

User device 105 also comprises one or more peripherals 265, such as a camera, USB connector, Bluetooth interface and/or the like.

RF transceiver 210 receives from antenna 205 an incoming RF signal transmitted by a base station of wireless network 100. RF transceiver 210 down-converts the incoming RF signal to produce an intermediate frequency (IF) or a baseband signal. The IF or baseband signal is sent to receiver processing circuitry 225, which produces a processed baseband signal by filtering, digitizing the baseband or IF signal, additional filtering, if necessary, demodulation and/or decoding. Receiver processing circuitry 225 transmits the processed baseband signal to speaker 230 (i.e., voice data) or to main processor 240 for further processing (e.g., web browsing).

Transmitter processing circuitry 215 receives analog or digital voice data from microphone 220 or other outgoing baseband data (e.g., web data, e-mail, interactive video game data) from main processor 240. Transmitter processing circuitry 215 encodes, modulates, multiplexes, and/or digitizes the outgoing baseband data to produce a processed baseband or IF signal. RF transceiver 210 receives the outgoing processed baseband or IF signal from transmitter processing circuitry 215. RF transceiver 210 up-converts the baseband or IF signal to an RF signal that is transmitted via antenna 205.

In an advantageous embodiment of the present disclosure, main processor 240 is a microprocessor or microcontroller. Memory 260 is coupled to main processor 240. According to an advantageous embodiment of the present disclosure, part of memory 260 comprises a random access memory (RAM) and another part of memory 260 comprises a non-volatile memory, such as Flash memory, which acts as a read-only memory (ROM).

Main processor 240 executes basic operating system program 261 stored in memory 260 in order to control the overall operation of user device 105. In one such operation, main processor 240 controls the reception of forward channel signals and the transmission of reverse channel signals by RF transceiver 210, receiver processing circuitry 225, and transmitter processing circuitry 215, in accordance with well-known principles.

Main processor 240 is capable of executing other processes and programs resident in memory 260. Main processor 240 can move data into or out of memory 260, as required by an executing process. Main processor 240 is also coupled to I/O interface 245. I/O interface 245 provides user device 105 with the ability to connect to other devices such as laptop computers and handheld computers. I/O interface 245 is the communication path between these accessories and main controller 240.

Main processor 240 is also coupled to keypad 250 and display unit 255. The operator of user device 105 uses keypad 250 to enter data into user device 105. Display 255 may be a liquid crystal display capable of rendering text and/or at least limited graphics from web sites. Alternate embodiments may use other types of displays.

As described below, peripheral controller 262 is operable to manage the functionality of peripherals 265 in order to provide security for the enterprise associated with secure zone 120. However, it will be understood that peripheral controller 262 may also be operable to manage the functionality of peripherals 265 in a similar manner for purposes other than security without departing from the scope of the present disclosure.

Peripheral controller 262 is operable to communicate with security controller 115 and to store and modify data in and retrieve data from security data 263 based on the communication with security controller 115. Based on the security data 263, peripheral controller 262 is operable to disable one or more peripherals 265 (which for some embodiments may include I/O interface 245 and/or other illustrated components) when user device 105 is within secure zone 120 without interaction between server 110 and user device 105. In addition, peripheral controller 262 is operable to enable the previously disabled peripherals 265 when user device 105 exits secure zone 120. Thus, server interaction with user device 105 for security purposes may be limited to initializing and maintaining security data 263.

Security controller 115 may be operable to provide a location of secure zone 120 and a list of peripherals 265 to be disabled when user device 105 is within secure zone 120 to user device 105. Peripheral controller 262 is then operable to store the information provided by security controller 115 as security data 263.

Device locator 264 is operable to determine a location of user device 105 using any suitable locating process. For example, device locator 264 may be operable to determine a location of user device 105 by identifying GPS coordinates for the user device 105 based on any suitable GPS locating algorithm. Peripheral controller 262 is operable to receive the location information determined by device locator 264 and to determine when user device 105 has entered or exited secure zone 120 based on the location information provided by device locator 264 as compared to the location information associated with the secure zone 120 in security data 263. When user device 105 enters secure zone 120, peripheral controller 262 is operable to automatically disable the peripherals 265 associated with that secure zone 120 and, when user device 105 exits secure zone 120, peripheral controller 262 is operable to automatically enable the previously disabled peripherals 265.

For some embodiments, peripheral controller 262 may be operable to store data as security data 263 for multiple secure zones 120 and may be operable to automatically disable different peripherals for each secure zone 120. Thus, for example, upon entering a first secure zone 120, user device 105 may be operable to disable peripheral 1 265a. However, upon entering a second secure zone 120, the same user device 105 may be operable to disable peripheral 2 265b and peripheral N 265c.

For some embodiments, a user of user device 105 may be able to view but not modify security information, such as security data 263 and/or other information relevant to security. For example, the viewable security information may comprise an identifier and/or a location for each secure zone 120 for which information is stored in security data 263, an identifier and/or a location for a current secure zone 120 that is disabling peripherals 265, a list of peripherals 265 to be disabled for each secure zone 120, a list of peripherals 265 currently disabled for the current secure zone 120 and/or the like.

For some embodiments, security controller 115 may be operable to provide a time limit to user device 105 as part of the security data 263 for the corresponding secure zone 120. For these embodiments, security data 263 may also comprise a time limit corresponding to the secure zone 120 such that the information related to the secure zone 120 may be deleted by peripheral controller 262 after the time limit has expired. For example, a visitor to an enterprise may have security data 263 stored in his or her user device 105 for a secure zone 120 for that enterprise. However, if the user will only be visiting the secure zone 120 for a few hours or days, the security data 263 for that secure zone 120 need not be stored permanently in user device 105. Thus, after the time limit expires, the security data 263 may be deleted and memory 260 may be made available for other purposes instead of being wasted on information that is no longer of any use.

For an alternative embodiment, security data 263 for each secure zone 120 may be considered expired and thus may be deleted by peripheral controller 262 unless security controller 115 is able to communicate with the user device 105 within a predefined time limit. For this embodiment, security controller 115 may communicate with user device 105 on a regular basis to update or verify the security data 263 and/or for other suitable reasons. For this embodiment, if a user device 105 is unavailable for communication with security controller 115 for longer than the predefined time limit, peripheral controller 262 is free to delete the security data 263.

FIG. 3 is a flow diagram illustrating a method 300 for managing the functionality of a user device 105 according to one embodiment of the disclosure. Initially, user device 105 receives security information, such as a secure zone location and associated peripherals 265 to be disabled, for a particular secure zone 120 from security controller 115 (process step 305). Peripheral controller 262 stores the security information as security data 263 in user device 105 (process step 310). It will be understood that steps 305 and 310 may be repeated for any suitable number of secure zones 120.

Peripheral controller 262 monitors the location of user device 105 based on location information received from device locator 264 (process step 315). Peripheral controller 262 determines whether user device 105 has entered a secure zone 120 based on the received location information as compared to the previously stored security data 263 (process step 320). If user device 105 has not entered a secure zone 120 (process step 320), peripheral controller 262 continues to monitor the location of user device 105 (process step 315).

Once user device 105 has entered a secure zone 120 (process step 320), peripheral controller 262 automatically disables the peripheral or peripherals associated with the entered secure zone 120 as identified in the security data 263 (process step 325). Peripheral controller 262 then monitors the location of user device 105 again based on location information received from device locator 264 (process step 330).

Peripheral controller 262 determines whether user device 105 has exited the secure zone 120 based on the received location information as compared to the previously stored security data 263 (process step 335). If user device 105 remains in the secure zone 120 (process step 335), peripheral controller 262 continues to monitor the location of user device 105 (process step 330).

Once user device 105 has exited the secure zone 120 (process step 335), peripheral controller 262 automatically enables the previously disabled peripheral or peripherals associated with the secure zone 120 (process step 340). Peripheral controller 262 then monitors the location of user device 105 again based on location information received from device locator 264 (process step 315) to determine when user device 105 enters another secure zone 120 (process step 320). For some embodiments, as described above in connection with FIG. 2, peripheral controller 262 may also monitor an amount of time associated with each secure zone 120 and, if a time limit for a secure zone 120 expires, may delete the security data 263 for that secure zone 120.

In this way, after being initialized by security controller 115, user device 105 is able to disable and enable peripherals 265 automatically upon entering and exiting secure zones 120 without server interaction. Thus, at high-entry times such as the beginning of a workday, for example, server 110 is not subjected to numerous device detection events in order to disable the peripherals 265 of entering user devices 105 and thereby protect sensitive information within secure zone 120. As a result, bandwidth for communication between server 110 and user devices 105 is conserved. In addition, the load on server 110 is reduced, and the possibility of server overload conditions based on a large number of device detection events is eliminated.

Although the present invention has been described with an exemplary embodiment, various changes and modifications may be suggested to one skilled in the art. It is intended that the present invention encompass such changes and modifications as fall within the scope of the appended claims.

What is claimed is:

1. A method for managing the functionality of a user device, the method comprising:
   receiving security information for a secure zone from a security controller associated with the secure zone, the security information comprising a list of at least one peripheral to be disabled in the secure zone and a time limit during which the security information cannot be deleted from the user device, the at least one peripheral comprising a camera associated with the user device;
   storing the security information for the secure zone in the user device;
   based on the security information for the secure zone, automatically disabling the at least one peripheral associated with the secure zone when the user device enters the secure zone without further input from the security controller; and
   displaying at least a portion of the security information on the user device when the user device is in the secure zone, wherein the at least portion of security information comprises an identifier and a location of the secure zone and the list of the at least one peripheral to be disabled in the secure zone.

2. The method as set forth in claim 1, further comprising, based on the security information for the secure zone, automatically enabling the at least one peripheral associated with the secure zone when the user device exits the secure zone without further input from the security controller.

3. The method as set forth in claim 1, wherein the at least one peripheral further comprises a USB connector.

4. The method as set forth in claim 1, further comprising monitoring a location for the user device.

5. The method as set forth in claim 4, the security information for the secure zone further comprising a location for the secure zone, the method further comprising:
   comparing the location for the user device to the location for the secure zone; and
   determining whether the user device has entered the secure zone based on the comparison of the location for the user device to the location for the secure zone.

6. The method as set forth in claim 5, the location for the secure zone comprising a set of Global Positioning System (GPS) coordinates and a secure zone radius.

7. The method as set forth in claim 4 further comprising determining the location for the user device by determining a set of GPS coordinates for the user device.

8. The method as set forth in claim 1 further comprising:
   deleting the security information for the secure zone when the time limit for the secure zone has expired.

9. The method as set forth in claim 1, further comprising:
   storing security information for a second secure zone in the user device, the security information for the second secure zone comprising at least one peripheral associated with the second secure zone; and
   automatically disabling the at least one peripheral associated with the second secure zone when the user device enters the second secure zone based on the security information for the second secure zone.

10. A user device comprising:
    at least one peripheral comprising a camera associated with the user device;
    a memory configured to store security information for at least one secure zone, the security information received from a security controller associated with the at least one secure zone, the security information comprising a list of at least one peripheral to be disabled in the secure zone and a time limit during which the security information cannot be deleted from the user device; and
    a peripheral controller configured to disable the at least one peripheral associated with the secure zone when the user device enters the secure zone based on the security information for the secure zone and without further input from the security controller,
    wherein the user device is configured to display at least a portion of the security information when the user device is in the secure zone, the at least portion of security information comprising an identifier and a location of the secure zone and the list of the at least one peripheral to be disabled in the secure zone.

11. The user device as set forth in claim 10, the peripheral controller further configured to enable the at least one peripheral associated with the secure zone when the user device exits the secure zone based on the security information for the secure zone without further input from the security controller.

12. The user device as set forth in claim 10, wherein the at least one peripheral further comprises a USB connector.

13. The user device as set forth in claim 10, the peripheral controller further configured to monitor a location for the user device.

14. The user device as set forth in claim 13, the security information for the secure zone further comprising a location for the secure zone, the peripheral controller further configured to compare the location for the user device to the location for the secure zone and to determine whether the user device has entered the secure zone based on the comparison of the location for the user device to the location for the secure zone.

15. The user device as set forth in claim 14, the location for the secure zone comprising a set of GPS coordinates and a secure zone radius.

16. The user device as set forth in claim 13 further comprising:
    a device locator configured to determine the location for the user device by determining a set of GPS coordinates for the user device.

17. The user device as set forth in claim 10, the peripheral controller further configured to delete the security information for the secure zone when the time limit for the secure zone has expired.

18. The user device as set forth in claim 10,
    the memory further configured to store security information for a first secure zone and for a second secure zone, the security information for the first secure zone comprising at least one peripheral associated with the first secure zone, and the security information for the second secure zone comprising at least one peripheral associated with the second secure zone; and
    the peripheral controller configured to disable the at least one peripheral associated with the first secure zone when the user device enters the first secure zone, to enable the at least one peripheral associated with the first secure zone when the user device exits the first secure zone, to disable the at least one peripheral associated with the second secure zone when the user device enters the second secure zone, and to enable the at least one peripheral associated with the second secure zone when the user device exits the second secure zone.

19. A system for managing the functionality of user devices, comprising:
- a secure zone;
- a server for the secure zone, the server comprising a security controller configured to provide security information for the secure zone to a plurality of user devices, the security information comprising a list of at least one peripheral to be disabled in the secure zone and a time limit during which the security information cannot be deleted from the user device, the at least one peripheral comprising a camera associated with at least one of the user devices; and
- the plurality of user devices, each of the user devices configured to automatically disable the at least one peripheral identified by the security information for the secure zone when the user device enters the secure zone without further input from the security controller, and display at least a portion of the security information when the user device is in the secure zone, the at least portion of security information comprising an identifier and a location of the secure zone and the list of the at least one peripheral to be disabled in the secure zone.

20. The system as set forth in claim 19, wherein each of the user devices are further configured to automatically enable the at least one peripheral identified by the security information for the secure zone when the user device exits the secure zone without further input from the security controller.

21. The system as set forth in claim 19, the security information for the secure zone comprising a location for the secure zone.

22. The system as set forth in claim 21, the location for the secure zone comprising a set of GPS coordinates and a secure zone radius.

23. The system as set forth in claim 19, wherein each of the user devices operable are further configured to delete the security information for the secure zone when the time limit for the secure zone has expired.

24. The system as set forth in claim 19, the security controller configured to provide security information for the secure zone to the plurality of user devices by initializing the security information in each of the user devices.

25. The system as set forth in claim 24, the security controller further configured to provide security information for the secure zone to the plurality of user devices by maintaining the security information in each of the user devices.

* * * * *